(No Model.)
J. C. GARROOD.
DRIVE CHAIN.
No. 569,632. Patented Oct. 20, 1896.
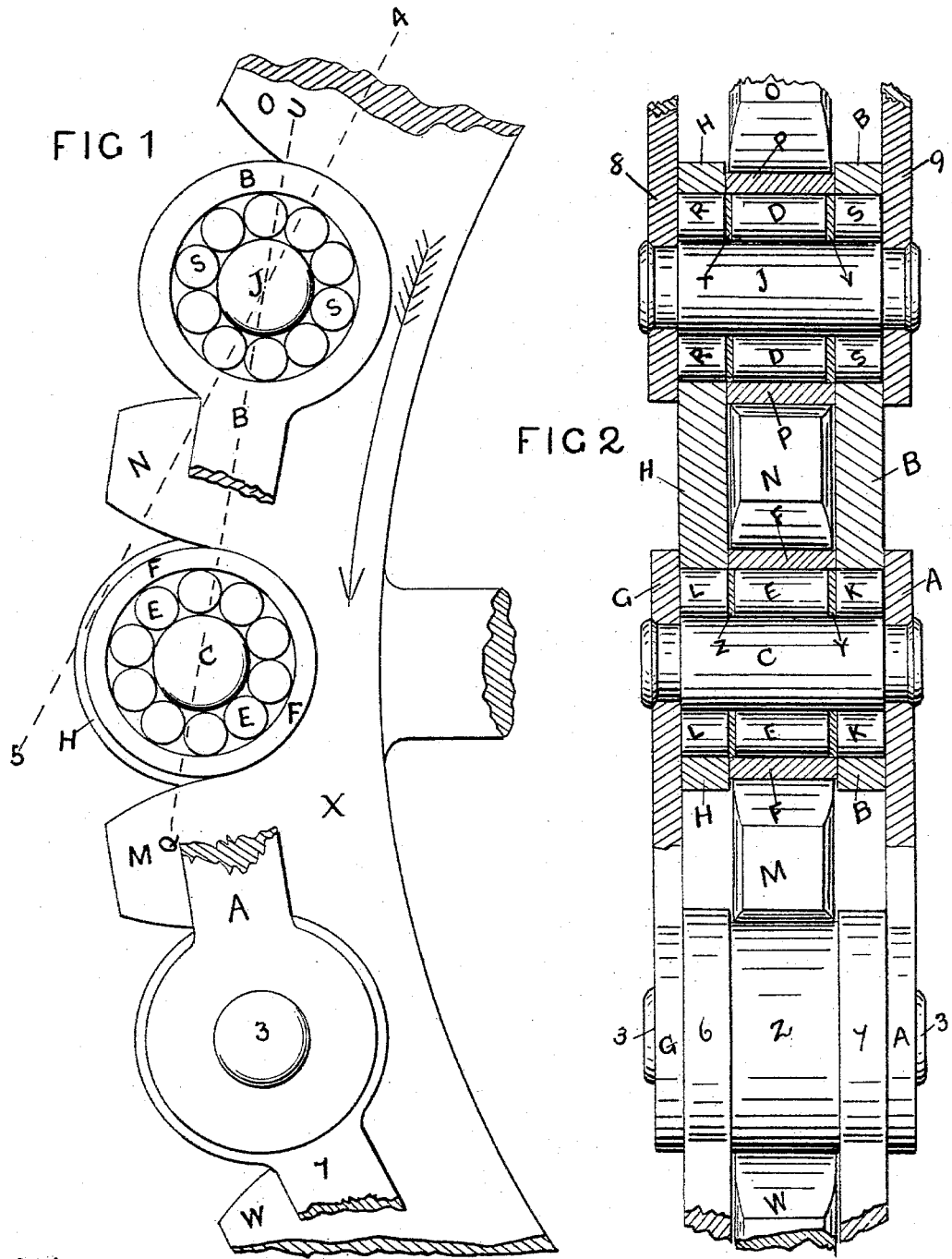
WITNESSES
S B Breed
E Gorham
INVENTOR
John C. Garrood

UNITED STATES PATENT OFFICE.

JOHN C. GARROOD, OF LYNN, MASSACHUSETTS.

DRIVE-CHAIN.

SPECIFICATION forming part of Letters Patent No. 569,632, dated October 20, 1896.

Application filed August 3, 1895. Serial No. 558,083. (No model.)

*To all whom it may concern:*

Be it known that I, JOHN C. GARROOD, a subject of the Queen of Great Britain, residing in Lynn, in the county of Essex and State of Massachusetts, have invented new and useful Improvements in Antifriction Drive-Chains, of which the following is a specification.

This invention relates to antifriction drive-chains such as are used in connection with sprocket gear-wheels, and particularly to that class of drive-chains which are applicable to gears used in the construction of bicycles and tricycles and similar pedomotive vehicles. Moreover, it relates to that class of antifriction drive-chains in which rollers are employed for the purpose of reducing the friction.

The object of my invention is to reduce the friction in a greater degree than has heretofore been accomplished, especially as regards those portions of the chain which come in direct contact with the sprockets, and to render the chain itself as nearly frictionless as possible by means of the improved construction and combination and arrangement of parts fully described below and illustrated in the accompanying drawings, in which—

Figure 1 is a view, partly in section and partly in side elevation, of portions of links of my improved drive-chain in position upon a portion of a sprocket-wheel, portions of both the outer and inner links and certain of the rollers and washers being represented as having been removed, the better to illustrate the invention. Fig. 2 is a view, partly in plan and partly in section, taken on line Q U, Fig. 1.

Similar letters of reference indicate corresponding parts.

This chain consists of two styles of links—viz., outer links and inner links, said outer links and inner links being arranged in pairs and each pair of outer links being connected at both ends with the adjacent pairs of inner links by pins, each of which extends through a pair of outer and a pair of inner links. These pins are riveted to and hence fast in the outer links, while the inner links move on said pins by means of a circle of rollers intermediate of said pins and inner links. Around each pin and separated therefrom by a circle of rollers is a free hollow roller or ring located between the inner links and occupying the space between them. These free hollow rollers or rings are the parts which come in direct contact with the sprockets on the wheel, and the effect is that the engagement of the tooth or sprocket with the chain causes this free hollow roller to partially rotate on its antifriction-rollers, thus preventing any sliding or rubbing of the sprocket on the hollow roller and hence preventing friction at that point.

A G and 8 9 represent two pairs of outside links, and H B a pair of inside links connected at their opposite ends with said outside links by means of the pins C J, said pins being riveted to the outside links and hence having no movement with relation to them. Another pin or rivet 3 is shown at the opposite ends of the outside links A G, by means of which the next inner pair of links 6 7 is connected therewith. Each end of each inner link H B 6 7 is chambered out to receive a circle of antifriction-rollers surrounding the pin. Thus the antifriction-rollers S, Figs. 1 and 2, are intermediate of the pin J and bearing portion of the inner link B, while the rollers R, Fig. 2, are between the inner link H and pin J, and the rollers L K between the pin C and the other ends of the inner links H B, respectively.

F, Fig. 1, and P, Fig. 2, are rings or free hollow rollers placed around the pins C and J, respectively, and separated therefrom by the antifriction-rollers E and D, respectively. The antifriction-rollers E are separated from the rollers L by a ring-shaped washer Z and from the rollers K by a similar washer Y, while the rollers D are separated from the rollers R and the rollers S, respectively, by similar washers T and V.

X represents a portion of a sprocket-wheel, of which W, M, N, and O are sprockets or teeth.

In practical operation, when my improved chain is in engagement with a sprocket-wheel, as shown in the drawings, the contact is directly between the sprockets and the free hollow rollers. Thus the sprocket M comes in direct contact with the hollow rollers 2 and F, while the sprocket N engages with the hollow rollers F and P. Now as the chain moves over the wheel these sprockets, as they engage the rollers 2 F P, instead of slipping or rubbing over them, impart a partial rotation to each roller, and said rollers roll over the antifriction-rollers E and D, which are between them and the pins C and J. Hence there is no sliding contact at any point between the sprockets and the pins C J. As these pins C J are riveted to the outside links G A and 8 9 there can be no friction between them and said outside links, while as the inside links H B are separated by the antifriction-rollers L K and R S from the pins C J there can be no sliding friction between said inside rollers and pins. The washers Z Y T V preferably do not extend between the free hollow rollers and the inner links, but are entirely within said hollow rollers. Thus it will be seen that I have provided, by means of the arrangement and construction of the parts of my chain with relation to each other, a drive-chain in which there is to all intents and purposes a complete absence of sliding contact, either between the parts of the chain or between the chain and the sprockets, all the contacts being of a rolling nature, the sprockets rolling over the surface of the intermediate hollow rollers, the latter rolling over the circle of antifriction-rollers E D, they in turn rolling over the pins, and said pins rolling within the antifriction-rollers which are between them and the inside links.

I am aware that it is not new to insert rollers or balls between the links of a drive-chain and the pins connecting the same, and I make no claim, broadly, to such construction; but

What I claim, and desire to secure by Letters Patent, is—

The combination of the axle or pin C, outside link G, set of rollers L, washer Z, set of rollers E, washer Y, set of rollers K, hollow, roller bearing roller F, inside roller bearing link B, set of rollers R, washer T, set of rollers D, washer V, set of rollers S, and hollow, roller bearing roller P, in an antifriction drive-chain, substantially as described.

JOHN C. GARROOD.

Witnesses:
S. B. BREED,
E. GORHAM.